Patented Nov. 19, 1929

1,736,654

UNITED STATES PATENT OFFICE

EMIL LAY AND CARL MATTICK, OF FRANKFORT-ON-THE-MAIN, GERMANY, ASSIGNORS TO AMERICAN LURGI CORPORATION, OF NEW YORK, N. Y., A CORPORATION OF NEW YORK

HARD SOLDER PARTICULARLY FOR GREY PIG IRON, CAST STEEL, IRON AND THE LIKE

No Drawing. Application filed February 15, 1928, Serial No. 254,610, and in Germany February 18, 1927.

This invention relates to a hard solder particularly for grey pig iron, cast steel, iron and the like.

Repairs to, and additions to parts of cast iron have hitherto been effected by autogenous welding and it is only lately that the tendency has been to employ hard solders to a greater extent in view of the danger which is encountered by setting up stresses due to welding.

As is well known wires of hard solder fuse at a temperature of about 300° C., lower than rods of cast iron, so that when soldering the temperature variations within the workpiece are not so high as those occurring during autogenous welding and consequently also such great stresses are not set up.

The hitherto usual wires only partly fulfil the requirements demanded from such a hard solder. A hard solder wire for cast iron and the like must melt smoothly and without liberating vapour, must be capable of being applied without forming pores and must possess a hardness which corresponds to that of cast iron of the work-piece. These requirements are of particular importance when hard-soldering operations are to be carried out in a continuous manner.

It is known that the desired hardness can be attained by alloying nickel to brass alloys. However when added in larger amounts, nickel renders the material refractory and gives rise to the active liberation of zinc vapours so that the applied solder becomes porous. For this reason nickel-brass alloys or German silver alloys cannot be employed directly.

It has now been found that this disadvantage can be overcome by alloying silicon in amounts of up to 3%. In many cases a silicon-content of 0.5% is sufficient. The addition of silicon renders the hard solder more fluid and the nickel renders it harder so that any desired degree of fluidity and toughness can be attained by suitably mutually adjusting the additions of nickel and silicon.

A hard solder according to the invention preferably comprises 42 to 60% of copper, 1 to 10% of nickel and up to 3% of silicon, the remainder consisting of zinc.

A wire of the following composition has been found particularly suitable viz:

50 to 53% copper, 2 to 5% nickel, 0.2 to 1% silicon, remainder zinc.

The alloys of a composition within the above described limits have the advantage that they can at the same time be easily pressed or extruded so that wires can easily be produced therefrom.

Claim:

Hard solder particularly for grey pig iron, cast steel, iron and the like, comprising 42 to 60% copper, 1 to 10% nickel and an appreciable amount up to 3% silicon, the remainder consisting of zinc.

In testimony whereof we affix our signatures.

DR. EMIL LAY.
DR. CARL MATTICK.